(12) United States Patent
Bledsoe et al.

(10) Patent No.: US 8,699,055 B2
(45) Date of Patent: Apr. 15, 2014

(54) IMAGE PROCESSING APPARATUS WITH SYMMETRIC PROCESSORS

(75) Inventors: J. Daren Bledsoe, Albany, OR (US); Gregory F. Carlson, Corvallis, OR (US); Todd A. McClelland, Corvallis, OR (US); Patrick A. McKinley, Corvallis, OR (US)

(73) Assignee: Marvell International Technology Ltd. (BM)

( * ) Notice: Subject to any disclaimer, the term of this patent is extended or adjusted under 35 U.S.C. 154(b) by 1372 days.

(21) Appl. No.: 10/915,006

(22) Filed: Aug. 9, 2004

(65) Prior Publication Data

US 2006/0028666 A1 Feb. 9, 2006

(51) Int. Cl.
*G06F 3/12* (2006.01)
(52) U.S. Cl.
USPC ............ 358/1.15; 358/1.9; 358/2.1; 358/474; 358/3.27; 382/224; 382/199
(58) Field of Classification Search
USPC ........ 358/518, 3.23, 530, 523–525, 1.13, 1.1, 358/1.14, 1.15, 1.9; 709/217, 224, 223, 709/249, 238
See application file for complete search history.

(56) References Cited

U.S. PATENT DOCUMENTS

| | | | |
|---|---|---|---|
| 4,992,775 A | 2/1991 | Castle et al. | |
| 5,243,518 A * | 9/1993 | Holt et al. | 715/201 |
| 5,546,547 A | 8/1996 | Bowes et al. | |
| 5,706,334 A | 1/1998 | Balk et al. | |
| 5,909,559 A | 6/1999 | So | |
| 6,018,787 A * | 1/2000 | Ip | 711/100 |
| 6,088,428 A | 7/2000 | Trandal et al. | |
| 6,105,119 A | 8/2000 | Kerr et al. | |
| 6,170,049 B1 | 1/2001 | So | |
| 6,172,705 B1 | 1/2001 | DiFrancesco et al. | |
| 6,177,895 B1 | 1/2001 | Vrancic et al. | |
| 6,219,149 B1 * | 4/2001 | Kawata et al. | 358/1.15 |
| 6,260,087 B1 | 7/2001 | Chang | |
| 6,298,370 B1 | 10/2001 | Tang et al. | |
| 6,386,490 B1 | 5/2002 | Suh | |
| 6,426,771 B1 | 7/2002 | Kosugi | |
| 6,948,050 B1 * | 9/2005 | Gove et al. | 712/35 |
| 7,336,395 B2 * | 2/2008 | Tone | 358/1.9 |
| 2001/0033392 A1 * | 10/2001 | Utsunomiya | 358/1.15 |
| 2001/0041018 A1 * | 11/2001 | Sonoda | 382/275 |
| 2002/0048035 A1 * | 4/2002 | Beaudet et al. | 358/1.14 |
| 2003/0023794 A1 * | 1/2003 | Venkitakrishnan et al. | 710/105 |
| 2004/0234135 A1 * | 11/2004 | Nomizu | 382/209 |
| 2004/0246502 A1 * | 12/2004 | Jacobsen et al. | 358/1.1 |

* cited by examiner

*Primary Examiner* — Twyler Haskins
*Assistant Examiner* — Brendan McCommas

(57) ABSTRACT

A multifunction image processing apparatus is disclosed. The apparatus includes a communications module, a scan subsystem, a print subsystem, and a digital signal processor (DSP) block. The communications module is used to communicate with a host computer to send and receive image data files. The scan subsystem is used to scan images. The print subsystem is used to print images. The DSP block includes at least two digital signal processors. The digital signal processors can be programmed to symmetrically multiprocess portions of an image data file to process it more quickly. Alternatively, digital signal processors can be programmed to simultaneously process the image data for the scan subsystem and image data for the print subsystem.

7 Claims, 2 Drawing Sheets

IMAGE PROCESSING APPARATUS WITH SYMMETRIC PROCESSORS

BACKGROUND

The present invention relates to image processing systems, and more particularly, to a multifunction printer, copier, and scanners.

Increasing number of documents, pictures, and other forms of information (generically refer herein to as a "document") are scanned, stored, printed, copied, and otherwise processed as digital format, each document represented and processed as digital image data. In addition, these documents are processed at ever-increasing resolution to capture and reproduce detailed information about the document.

To perform these operations (such as scanning, printing, and copying) many different apparatuses and systems are available in the marketplace. For example, FIG. 1 illustrates a multifunction printer (MFP) 10 designed to perform these operations. The MFP 10 includes a scan subsystem 20 for scanning documents to generate a scan image data 22 and a print subsystem 30 for printing print image data 32 on paper. The scan subsystem 20 and the print subsystem 30 are connected to a processor 40 which processes the scan image data 22 and print image data 32 as well as to control the operations of the scan subsystem 20 and the print subsystem 30. The processor 40 is also connected to a communications module 50 which manages communications of the MFP 10 with a host computer 60. Here, the connections between various components of the MFP 10 are realized using a system bus 12.

The MFP 10 can function as a scanner by scanning a document to generate a scan image data 22, processing the scan image data 22 to generate a scan data file 24, and sending the scan data file 24 to the host computer 60. The MFP 10 can function as a printing by receiving a print data file 34 from the host computer 60, processing the scan data file 34 to generate a print image data 32, and printing the print image data 32. The MFP 10 can function as a copier by first scanning a document to generate a scan image data 22, processing the scan image data 32 to generate a print image data 32, and printing the print image data 22. The scan image data 22, the print image data 32, the scan data file 24, and the print data file 34 arrives at the processor 40 as a data stream and leaves the processor 40 as a processed data stream.

For each of these operations, the processor 40 performs various operations on the image data and the data files. For example, the print data file 34 from the host computer is encoded in a page description language encoding the layout of the page described therein including, for example, fonts, text, and graphics. The processor 40 processes the print data file 34 by performing various operations, for example, font substitution, rotating, edge sharpening, and dithering. Further, the print data file 34 may include RGB (red, green, and blue) color encoding. In that case, the processor 40 needs to perform color space conversion to negative colors of cyan, magenta, yellow, and black and color reinforcement. This is because most printers utilize negative color space CMYK (cyan, magenta, yellow, and black) while most displace devices and computer files utilize positive color space (red, green, and blue).

The processor 40 performs these and other operations for each scan image data 22 and print data file 34. As the resolution of the documents increase and the speed of the scan subsystem 20 and the print subsystem 30 increases, the processor 40 is required to process increasing amounts of data. For example, if a letter size paper (8.5 inches by 11 inches) is scanned at 600 dpi (dots per inch), the total number of pixel positions is 33,660,000 (calculated as 600×600×8.5×11) for a single page of the document. For RGB color information, it is common to use 36 bits for each pixel position (12 bits for each of the three colors). Thus, a single page of color document can scan into a scan image data 22 having size of approximately 151.2 Megabytes (MB) (calculated as 33,600,000×36/8). The processor 40 needs to process this amount of data within several seconds or less.

In the current art, the processor 40 is typically implemented using a general purpose processor programmed to control the subsystems 20 and 30 as well as to process the data streams 22, 24, 32 and 34. As the scan subsystem 20, the print subsystem 30, and the communication module 50 are improved to handle the ever-increasing amounts of data at ever-increasing speeds, the processor 40 is becoming the bottleneck at which the data throughput of the entire image processing apparatus 10 is slowed.

Accordingly, there remains a need for an image processing apparatus with improved processing design allow for faster processing of various data streams.

SUMMARY

The need is met by the present invention. In one embodiment of the present invention, an image processing system includes a communications module, a digital signal processor (DSP) block, and a print subsystem. The communications module is adapted to receive a print data file representing an image. The DSP block includes at least two digital signal processors, each DSP adapted to simultaneously operate on a different portion of the image as represented by the print data file to generate a print image data. The print image data is printed by the print subsystem.

In a second embodiment of the present invention, an image processing system includes a communications module, a scan subsystem, a print subsystem, and a digital signal processor (DSP) block. The communications module is adapted to receive a print data file representing an image. The scan subsystem is adapted to scan a scan image to generate a scan image data. The print subsystem is adapted to print an image, the image represented by print image data. The digital signal processor (DSP) block includes a plurality of digital signal processors where a first digital signal processor is adapted to process the scan image data to generate a scan data file and a second digital signal processor is adapted to process a print data file to generate the print image data.

In a third embodiment of the present invention, a method of processing image data is disclosed. Firstly, a first portion of the image data is allocated to a first digital signal processor for processing and a second portion of the image data is allocated to a second digital signal processor for processing. The allocated portions of the image data are processed simultaneously. Then, the processed portions of the image data are combined.

Other aspects and advantages of the present invention will become apparent from the following detailed description, taken in conjunction with the accompanying drawings, illustrating by way of example the principles of the invention.

DETAILED DESCRIPTION

The present invention will now be described with reference to the FIGS. 1 through 4, which illustrate various embodiments of the present invention. In the Figures, some sizes of structures or portions may be exaggerated relative to sizes of other structures or portions for illustrative purposes and, thus, are provided to illustrate the general structures of the present invention. Furthermore, various aspects of the present invention are described with reference to a structure or a portion positioned "on" or "above" relative to other structures, portions, or both. As will be appreciated by those of skill in the art, relative terms and phrases such as "on" or "above" are used herein to describe one structure's or portion's relationship to another structure or portion as illustrated in the Figures. It will be understood that such relative terms are intended to encompass different orientations of the device in addition to the orientation depicted in the Figures. For example, if the device in the Figures is turned over, rotated, or both, the structure or the portion described as "on" or "above" other structures or portions would now be oriented "below," "under," "in front of," "behind," or "beside" the other structures or portions. Like numbers refer to like elements throughout.

As shown in the Figures for the purposes of illustration, embodiments of the present invention are exemplified by an image processing system having a print subsystem adapted to print an image, the image represented by print image data; and a digital signal processor (DSP) block having at least two digital signal processors. Each of the digital signal processors are adapted to operate, simultaneously with the other digital processors, on a different portion of the image data such that the entire image is processed at the same time. Because two, four, or more digital signal processors are used in symmetric multiprocessing mode, large amount of image data is processed quickly.

Figure 1:
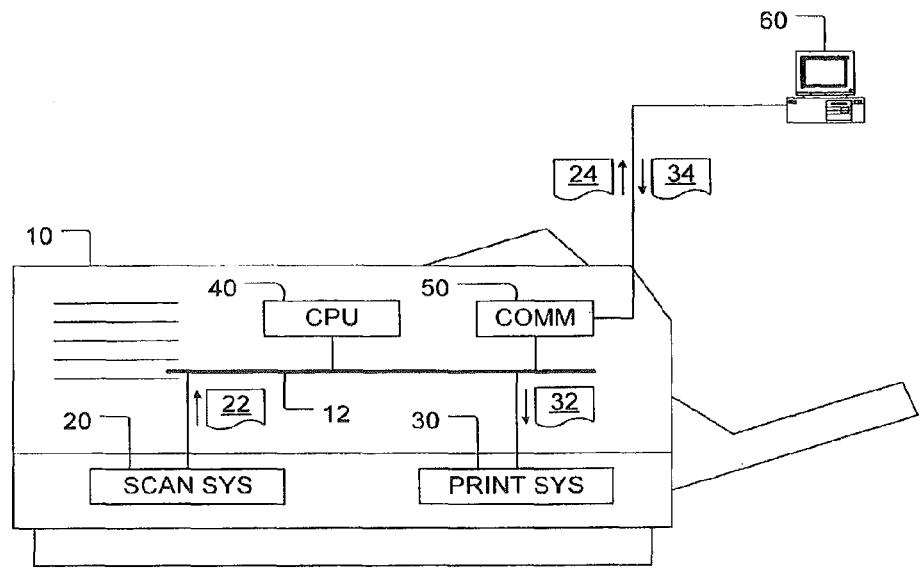
FIG. 1 is a simplified diagram of a prior art image processing apparatus.
Figure 2:
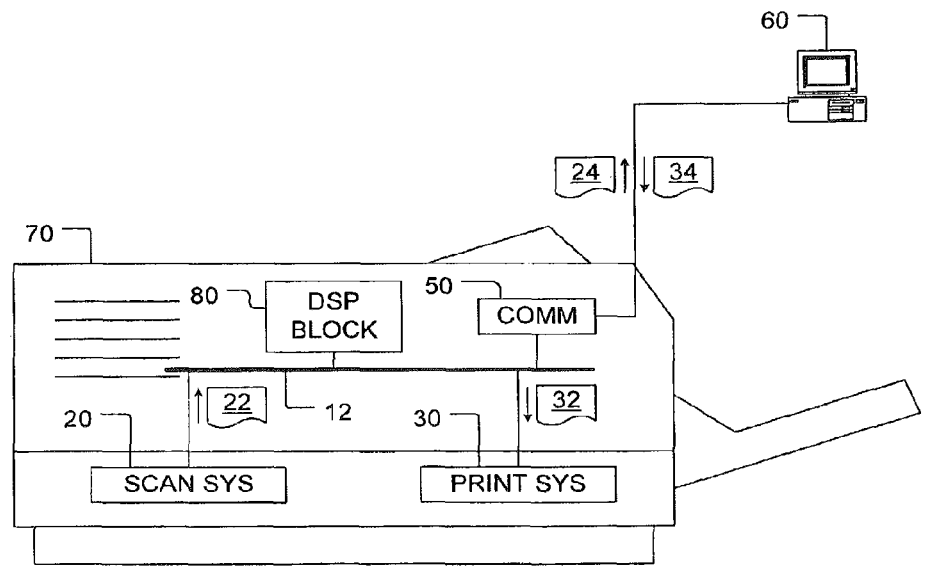
FIG. 2 is a simplified diagram of an image processing apparatus in accordance with one embodiment of the present invention.

FIG. 2 is a simplified diagram of an image processing apparatus 70 in accordance with one embodiment of the present invention. The image processing apparatus 70 include components that are similar to corresponding components of the image processing apparatus 10 of FIG. 1. For convenience, components in FIG. 2 that are similar to corresponding components in FIG. 1 are assigned the same reference numerals and different components are assigned different reference numerals.

Figure 3:
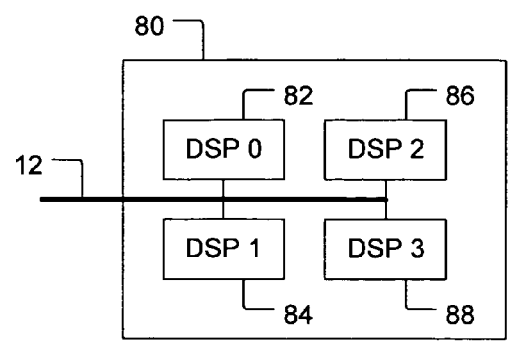
FIG. 3 is a more detailed view of a portion of the image processing apparatus of FIG. 2.

Referring to FIG. 2, the image processing apparatus 70 includes a scan subsystem 20 adapted to scan a document, a scan image, to generate a scan image data 22, a print subsystem 30 adapted to print image data 32 on paper, and a communication module 50 adapted communicate with a host computer 60 in transmitting scanned data files 24 and receiving print data files 34 as well as other control signals. The scan subsystem 20, the print subsystem 30, and the communications module 60 are connected to a digital signal processor (DSP) block 80 via a system bus 12. The DSP block 80 is illustrated in more detail in FIG. 3. Referring to FIGS. 2 and 3, the DSP block 80 includes at least two digital signal processors. In the illustrated embodiment, the DSP block 80 includes four digital signal processors 82 (first DSP), 84 (second DSP), 86 (third DSP), and 88 (fourth DSP), all connected to a system bus 12.

To print a file, the host computer 60 sends an image to be printed by sending a print data file 34 representing the image. The print data file 34, representing the image to be printed, is received by the communications module 50 and forwarded to the DSP block 80. Each of the digital signal processors 82, 84, 86, and 88 of the DSP block 80 is adapted to simultaneously operate on a different portion of the image as represented by the print data file 34 to generate a print image data 32. The print image data 32 is sent to the print subsystem 30 to print the image presented by the print image data 32 which is also the image represented by print data file 34.

To process the print data file 34 from a host computer 60, a first portion (for instance, top portion) of the print data file 34 is allocated to the first digital signal processor 82 and a second portion (for instance, bottom portion) of the print data file 34 is allocated to a second digital signal processor 84 for symmetric simultaneous processing. Following the symmetric processing of the portions, the processed portions are combined to form the print image data 32.

In fact, the print data file 34 can be parsed into even smaller portions (four portions in the current example), each portion allocated to one of the available digital signal processors (four digital signal processors in the current example) for more efficient processing. In alternate configuration, the DSP block 80 can include greater number of digital signal processors, each digital signal processor adapted to operate on a portion of the print data file 34 such that the entire print data file is processed more quickly compared to the time required to process the print image data 34 using a single general purpose processor 40 of FIG. 1.

Figure 4:
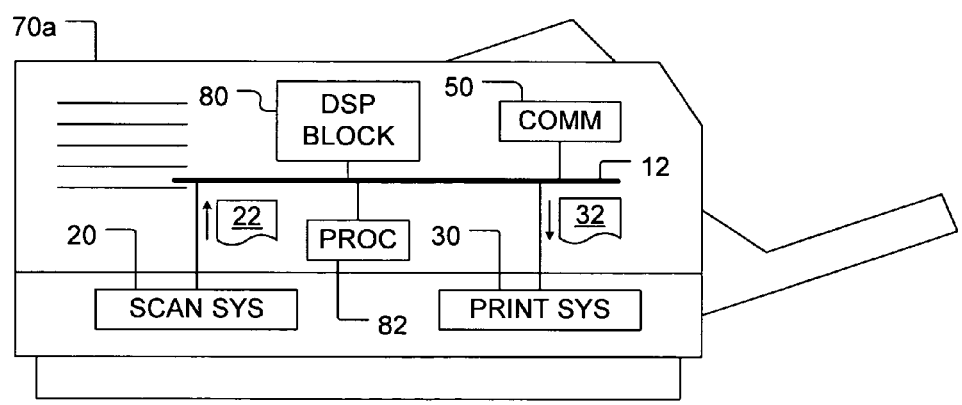
FIG. 4 is a simplified diagram of an image processing apparatus in accordance with another embodiment of the present invention.

One of the digital signal processors, for example the first digital signal processor 82 can be adapted and configured to divide the print data file 34 into smaller portions and to allocate the divided portions to the various digital signal processors including itself and the other digital signal processors of the DSP block 80. Alternatively, a control processor connected to the DSP block 80 can be used to divide the print data file 34 into smaller portions and to allocate the divided portions to the various digital signal processors of the DSP block 80. This alternative configuration is illustrated as the image processing apparatus 70a of FIG. 4. In FIG. 4, the control processor is designated with reference numeral 82. The image processing apparatus 70a of FIG. 4 is identical to the image processing apparatus 70 of FIG. 2 but for the addition of the control processor 82.

Referring again to FIGS. 2 and 3, the image processing apparatus 70 includes a scan subsystem 20 adapted to scan an image to generate scan image data 22, the scan image data representing the scanned image. The scan subsystem 20 is connected to the DSP block 80 via the system bus 12. Similar to the print data file 34, the scan image data 22 is divided into portions each of which can be simultaneously processed by the digital signal processors 82, 84, 86, and 88 of the DSP block 80 for symmetric processing to increase the throughput of the image processing apparatus 70. Following the symmetric processing of the portions, the processed portions are combined to form the scan data file 24. Here, to process portions of the scan image data 22, each of the digital signal processors 82, 84, 86, and 88 of the DSP block 80 is adapted to operate on a portion of the scan image data 22 such that the entire scan image data is processed.

One of the digital signal processors, for example the first digital signal processor 82 can be adapted and configured to divide the scan image data 22 into smaller portions and to allocate the divided portions to the various digital signal processors including itself and the other digital signal processors of the DSP block 80. Alternatively, the control processor 82 of FIG. 4 connected to the DSP block 80 can be used to divide the scan image data 22 into smaller portions and to allocate the divided portions to the various digital signal processors of the DSP block 80. Again, this alternative configuration is illustrated as the image processing apparatus 70a of FIG. 4.

Again referring to FIGS. 2 and 3, both the scan subsystem 20 and the print subsystem 30 of the image processing apparatus 70 can operate simultaneous with the digital signal processors 82, 84, 86, and 88 of the DSP block 80. In that mode, the scan image data 22 is allocated to the first digital signal processor 82 for processing while the print data file 34 is allocated to the second digital signal processor 84 for processing. Alternately, processing of the scan image data 22 can be symmetrically performed by the first and the third digital signal processors 82 and 86 while processing of the print data file 34 can be symmetrically performed by the second and the fourth digital signal processors 84 and 88. By using the digital signal processors 82, 84, 86, and 88 of the DSP block 80 to process different data streams, the image processing apparatus 70 can scan and print simultaneously.

For simultaneous operation of the scan subsystem 20 and the print subsystem 30, one of the digital signal processors, for example the first digital signal processor 82 can be adapted and configured to allocate the scan image data 22 to the first digital signal processor 82 and to allocate the print data file 34 to the second digital signal processor 84. Alternatively, the control processor 82 of FIG. 4 connected to the DSP block 80 can be adapted to allocate the scan image data 22 to the first digital signal processor 82 and to allocate the print data file 34 to a second digital signal processor 84.

As illustrated, the DSP block 80 including its digital signal processors 82, 84, 86, and 88 is fabricated on a single integrated circuit chip. The image processing apparatus 70 can be, for example, a scanner, a copier, or a multifunction printer (MFP). A number of DSP blocks are available in the marketplace, for example, models CW4011/CW4511/CW4512 of ChipWrights, Inc. of Waltham, Mass., or models SP-3/SP-5/SP-5Flex of 3DSP Corporation of Irvine, Calif. For the control processor 82, the following models are available from the marketplace: models ARM946/ARM1026EJ-S/ARM1156T2(F)-S from ARM, Inc. of Austin, Tex.; models MIP5KF/MIPS 20KC/MIPS24KF from MIPS Technologies, Inc. of Mountain View, Calif.; and models ColdFire MCF5xxx/MCF5232/MCF5233 Series from Motorola, Inc. of Schaumburg, Ill.

To process the scan image data 22 and the print data file 34, the DSP block 80 including its digital signal processors 82, 84, 86, and 88 can perform various operations on the data and the data file. For example only, the processing functions can include font substitution, rotating, edge sharpening, dithering, color space conversion, and color reinforcement.

From the foregoing, it will be apparent that the present invention is novel and offers advantages over the current art. Although specific embodiments of the invention are described and illustrated above, the invention is not to be limited to the specific forms or arrangements of parts so described and illustrated. The invention is limited by the claims that follow.

What is claimed is:

1. A multifunction printing system comprising:
   a module configured to transmit a scan data file to a host system and receive a print data file from the host system;
   first and second digital signal processors;
   at least one master digital signal processor in communication with the first and second digital signal processors, wherein the at least one master digital signal processor and each of the first and second digital signal processors are reconfigurable to perform different image processing operations;
   a printing subsystem configured to concurrently execute image processing operations on different portions of the print data file provided from the host system through the module, where the image processing operations are executed pursuant to generation of print image data for printing by the printing subsystem, the at least one master digital signal processor managing the first and second digital signal processors by assigning the different portions of the print data file to one or more of the first and second digital signal processors, including itself, to execute the concurrent image processing operations on the print data file;
   a scanning subsystem configured to concurrently execute image processing operations on different portions of scan image data provided by a scanner of the scanning subsystem pursuant to generating the scan data file for transmission to the host system through the module, the at least one master digital signal processor managing the first and second digital signal processors by assigning the different portions of the scan image data to one or more of the first and second digital signal processors, including itself, to execute the concurrent image processing operations on the scan image data;
   wherein when only printing is required, the at least one master digital signal processor assigns different portions of the print data file to the first and the second digital signal processors, and when both printing and scanning are required, the at least one master digital signal processor assigns at least a portion of the print data file to the first digital signal processor and assigns at least a portion of the scan image data to the second digital signal processor;
   wherein the image processing operations executed by the printing subsystem and the image processing operations executed by the scanning subsystem occur simultaneously so that the image processing operations used to generate the print image data and the image processing operations used to generate the scan data file are executed independent of one another by the first and second digital signal processors, and the image processing operations are executed to concurrently generate the print image data and the scan data file for different images; and
   wherein the first and second digital signal processors execute a processing operation on the print data file and scan image data, respectively, where the processing operation is selected from a group consisting of font substitution, edge sharpening, pixel dithering, color space conversion, and color reinforcement.

2. The multifunction printing system of claim 1, wherein the apparatus further comprises a host computer in communication with the module.

3. The multifunction printing system of claim 1, wherein the first and second digital signal processors and the at least one master digital signal processor are formed in a single integrated circuit.

4. A multifunction printing system comprising:
   module means for transmitting a scan data file to a host system and for receiving a print data file from the host system;
   digital processor means for processing image data, where the digital processor means includes first and second digital signal processors, and at least one master digital signal processor in communication with the first and second digital signal processors, wherein the at least one master digital signal processor and each of the first and second digital signal processors are reconfigurable to perform different image processing operations;

printing subsystem means for generating a print image data from the print data file provided from the host system through the module means, where the printing subsystem means is configured to concurrently execute image processing operations on different portions of the print data file pursuant to generating the print image data, the at least one master digital signal processor managing the first and second digital signal processors by assigning the different portions of the print data file to one or more of the first and second digital signal processors, including itself, to execute the concurrent image processing operations on the print data file;

scanning subsystem means for providing the scan data file to the host system through the module means, where the scanning subsystem means is configured to concurrently execute image processing operations on different portions of scan image data provided by a scanner of the scanning subsystem means pursuant to generating the scan data file, the at least one master digital signal processor managing the first and second digital signal processors by assigning the different portions of the scan image data to one or more of the first and second-digital signal processors, including itself, to execute the concurrent image processing operations on the scan image data;

wherein when only printing is required, the at least one master digital signal processor assigns different portions of the print data file to the first and the second digital signal processors, and when both printing and scanning are required, the at least one master digital signal processor assigns at least a portion of the print data file to the first digital signal processor and assigns at least a portion of the scan image data to the second digital signal processor;

wherein the image processing operations executed by the printing subsystem means and the image processing operations executed by the scanning subsystem means occur simultaneously so the image processing operations used to generate the print image data and the image processing operations used to generate the scan data file are executed independent of one another by the first and second digital signal processors, and the image processing operations are executed to concurrently generate the print image data and the scan data file for different images; and wherein the first and second digital signal processors execute at least two processing operations selected from the group consisting of font substitution, image rotation, edge sharpening, pixel dithering, color space conversion, and color reinforcement.

5. The multifunction printing system of claim 4, wherein the first and second digital signal processors and the at least one master digital signal processor are formed in a single integrated circuit.

6. The multifunction printing system according to claim 1, wherein the at least one master digital signal processor and each of the first and second digital signal processors are configured to perform a same image processing operation.

7. The multifunction printing system according to claim 4, wherein the at least one master digital signal processor and each of the first and second digital signal processors are configured to perform a same image processing operation.

* * * * *